(12) United States Patent
Jaffe et al.

(10) Patent No.: US 8,015,514 B2
(45) Date of Patent: Sep. 6, 2011

(54) RANDOM PERSONALIZATION OF CHIPS DURING FABRICATION

(75) Inventors: Mark D. Jaffe, Shelburne, VT (US); Stephen A. Mongeon, Essex Junction, VT (US); Leah M. P. Pastel, Essex, VT (US); Jed H. Rankin, Richmond, VT (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 12/344,725

(22) Filed: Dec. 29, 2008

(65) Prior Publication Data

US 2010/0164013 A1   Jul. 1, 2010

(51) Int. Cl.
*G06F 17/50* (2006.01)

(52) U.S. Cl. ......... 716/54; 716/56; 716/100; 716/101; 716/104; 716/106; 716/110; 716/111; 716/112; 716/122; 714/724; 714/728; 702/179; 702/180; 702/181

(58) Field of Classification Search ............ 716/54, 716/56, 100, 101, 104, 106, 110–112, 122; 714/724, 728; 702/179–181
See application file for complete search history.

(56) References Cited

U.S. PATENT DOCUMENTS

| | | | |
|---|---|---|---|
| 5,541,814 A | 7/1996 | Janai et al. | |
| 6,093,630 A | 7/2000 | Geffken et al. | |
| 6,344,373 B1 | 2/2002 | Bhattacharyya et al. | |
| 6,742,174 B1 * | 5/2004 | Chen et al. | 716/104 |
| 6,795,952 B1 | 9/2004 | Stine et al. | |
| 7,089,138 B1 * | 8/2006 | Bouchard et al. | 702/117 |
| 7,211,453 B2 | 5/2007 | Sandstrom | |
| 7,739,651 B2 * | 6/2010 | Melvin et al. | 716/50 |
| 7,797,068 B2 * | 9/2010 | Kyoh | 700/110 |
| 2008/0157223 A1 * | 7/2008 | Teo et al. | 257/401 |

OTHER PUBLICATIONS

Lim, et al., "Extracting secret keys from integrated circuits," Very Large Scale Integration (VLSI) Systems, IEEE Transactions on Publication, Oct. 2005, vol. 13, Issue: 10, pp. 1200-1205.
U.S. Appl. No. 11/869,179, Bueti, et al.

* cited by examiner

*Primary Examiner* — Nghia M Doan
(74) *Attorney, Agent, or Firm* — Gibb I.P. Law Firm, LLC

(57) ABSTRACT

Disclosed are embodiments of a method for randomly personalizing chips during fabrication, a personalized chip structure and a design structure for such a personalized chip structure. The embodiments use electronic device design and manufacturing processes to randomly or pseudo-randomly create a specific variation in one or more instances of a particular electronic device formed on each chip. The device design and manufacturing processes are tuned so that the specific variation occurs with some predetermined probability, resulting in a desired hardware distribution and personalizing each chip. The resulting personalized chips can be used for modal distribution of chips. For example, chips can be personalized to allow sorting when a single chip design can be used to support multiple applications. The resulting personalized chips can also be used for random number generation for creating unique on-chip identifiers, private keys, etc.

21 Claims, 10 Drawing Sheets

"Good" aerial image

"Poor" aerial image

No Dislocation In Pull-
Down nFET 1232

| Q2 | Q1 | READOUT |
|---|---|---|
| 1 | 0 | 1 |
| 0 | 1 | 0 |

Dislocation In Pull-
Down nFET 1232

| Q2 | Q1 | READOUT |
|---|---|---|
| 1->0 | 0->1 | 0 |
| 0 | 1 | 0 |

RANDOM PERSONALIZATION OF CHIPS DURING FABRICATION

BACKGROUND

1. Field of the Invention

The embodiments of the invention generally relate to random personalization of integrated circuit chips during fabrication and, more specifically, to embodiments of a method for randomly personalizing integrated circuit chips during fabrication, a personalized integrated circuit chip structure and a design structure for such a personalized integrated circuit chip structure.

2. Description of the Related Art

The usual goal when manufacturing integrated circuit (IC) chips is to fabricate identical good chips. However, there are a number of applications where personalized chips are desired. Chips personalized with unique on-chip identifiers can be used for chip identification. Such on-chip identifiers are typically created after manufacture by using a laser scribe, an array initialization or software. These techniques can be costly and time-consuming. Alternatively, such on-chip identifiers can be created by using on-chip fuses and/or anti-fuses which are programmed (i.e., blown) at test. Fuses and anti-fuses consume a relatively large amount of chip space. Additionally, programming fuses and/or anti-fuses at test increases testing time and costs. Chip personalized with private keys can be used for performing encryption functions. Such private keys are typically produced using complicated methods in which random numbers are generated based on thermal-noise, meta-stability, radioactive elements, etc. Thus, there is a need in the art for a non-complicated, cost and space saving technique for chip personalization in order to provide, for example, unique on-chip identifiers and/or private keys.

SUMMARY

In view of the foregoing, disclosed herein are embodiments of integrated circuit chip personalization method. The method embodiments comprise developing a first design for a particular electronic device. Next, the method embodiments comprise developing a second design for an integrated circuit chip that incorporates one or more instances of the electronic device according to the first design. Multiple integrated circuit chips are then fabricated according to the second design. Upon fabrication of the chips and without further processing, a specific variation will occur in any given instance of the electronic device with a predetermined probability. This predetermined probability is a function of the first design (i.e., of the design of the particular electronic device). Optionally, this predetermined probability can also be a function of one or more processes used during chip fabrication. If a single instance of the particular electronic device is formed on each chip, as described above, the presence (or absence) of the specific variation can be used for chip sorting. However, if multiple instances of the particular electronic device are formed on each chip, as described above, the multiple instances of the electronic device can be used to generate a unique pattern of logic values indicative of some of the multiple instances of the electronic device having the specific variation and others not. The unique pattern of logic values can function, for example, as an on-chip identifier or a private key.

One particular embodiment of this chip personalization method comprises developing a first design for a unique field effect transistor. Next, this method embodiment comprises developing a second design for an integrated circuit chip that incorporates one or more instances of the unique field effect transistor according to the first design. Multiple integrated circuit chips are then fabricated according to the second design. Upon fabrication of each chip and without further processing, a dislocation will occur in any given instance of the field effect transistor with a predetermined probability. This predetermined probability is a function of the first design (i.e., of the design of the particular field effect transistor). Optionally, this predetermined probability can also be a function of one or more processes used during chip fabrication. If a single instance of the field effect transistor is formed on each chip, as described above, the presence (or absence) of a dislocation can be used for chip sorting. However, if multiple instances of the field effect transistor are formed on each chip, as described above, the multiple instances of the field effect transistor can be used to generate a unique pattern of logic values indicative of some of the multiple instances of the field effect transistor having the dislocation and others not. The unique pattern of logic values can function, for example, as an on-chip identifier or a private key.

Also disclosed is an exemplary embodiment of a personalized integrated circuit chip formed, with one or more electronic devices (e.g., field effect transistors), according to the above-described method embodiments. That is, the personalized integrated circuit chip can comprise at least one electronic device that has a predetermined probability of having a specific variation.

For example, the chip can comprise at least one uniquely designed field effect transistor that has a predetermined probability of having a dislocation extending across the channel region between the source/drain regions. Specifically, this field effect transistor can comprise a single crystalline semiconductor layer comprising source/drain regions and a channel region between the source/drain regions. A trench isolation region can border the semiconductor layer and a gate structure can be positioned above the semiconductor layer and trench isolation region. The gate structure can comprise a main portion above and traversing the channel region. It can also comprise an additional portion above the trench isolation region. This additional portion can extend outward from the main portion adjacent to a side of the semiconductor layer towards one end of a source/drain region. As mentioned above, this field effect transistor can have a predetermined probability of having a dislocation in the channel region extending between the source/drain regions. This predetermined probability is a function of the design of the transistor. More particularly, the predetermined probability is a function of the position and shape of the additional portion relative to the main portion and, thereby the position and shape of gate sidewall spacers, during fabrication. That is, the gate sidewall spacers can cause stress on the semiconductor layer during fabrication and this stress in turn can cause the above-described dislocation with a predetermined probability. Optionally, this predetermined probability can also be a function of one or more process steps used during fabrication.

Finally, also disclosed are embodiments of a design structure tangibly embodied in a machine readable medium for designing, manufacturing, or testing an integrated circuit, the design structure comprising an integrated circuit chip and the chip comprising one or more instances of an electronic device (e.g., a field effect transistor), having a predetermined probability of having a specific variation (e.g., a dislocation).

BRIEF DESCRIPTION OF THE SEVERAL VIEWS OF THE DRAWINGS

The embodiments of the invention will be better understood from the following detailed description with reference to the drawings, which are not necessarily drawn to scale and in which.

DETAILED DESCRIPTION

The embodiments of the invention and the various features and advantageous details thereof are explained more fully with reference to the non-limiting embodiments that are illustrated in the accompanying drawings and detailed in the following description.

As mentioned above, the usual goal when manufacturing integrated circuit (IC) chips is to fabricate identical good chips. However, there are a number of applications where personalized chips are desired. Chips personalized with unique on-chip identifiers can be used for chip identification. Such on-chip identifiers are typically created after manufacture by using a laser scribe, an array initialization or software. These techniques can be costly and time-consuming. Alternatively, such on-chip identifiers can be created by using on-chip fuses and/or anti-fuses which are programmed (i.e., blown) at test. Fuses and anti-fuses consume a relatively large amount of chip space. Additionally, programming fuses and/or anti-fuses at test increases testing time and costs. Chips personalized with private keys can be used for performing encryption functions. Such private keys are typically produced using complicated methods in which random numbers are generated based on thermal-noise, meta-stability, radio-active elements, etc. Thus, there is a need in the art for a non-complicated, cost and space saving technique for chip personalization in order to provide, for example, unique on-chip identifiers and/or private keys. In addition, there is a need in the art for such chip personalization that can not be reverse engineered without destroying chip function.

In view of the foregoing, disclosed herein are embodiments of a method for randomly personalizing chips during fabrication, a personalized chip structure and a design structure for such a personalized chip structure. The embodiments use electronic device design as well as manufacturing processes to randomly or pseudo-randomly create a specific variation (e.g., a defect, a parametric variation or a variation in an electrical property) in one or more instances of a particular electronic device formed on each chip. The device design and manufacturing processes are tuned so that the specific variation occurs with some predetermined probability, resulting in a desired distribution of hardware characteristics, preferably confined to a specific region, and, thereby personalizing each chip.

Figure 1:
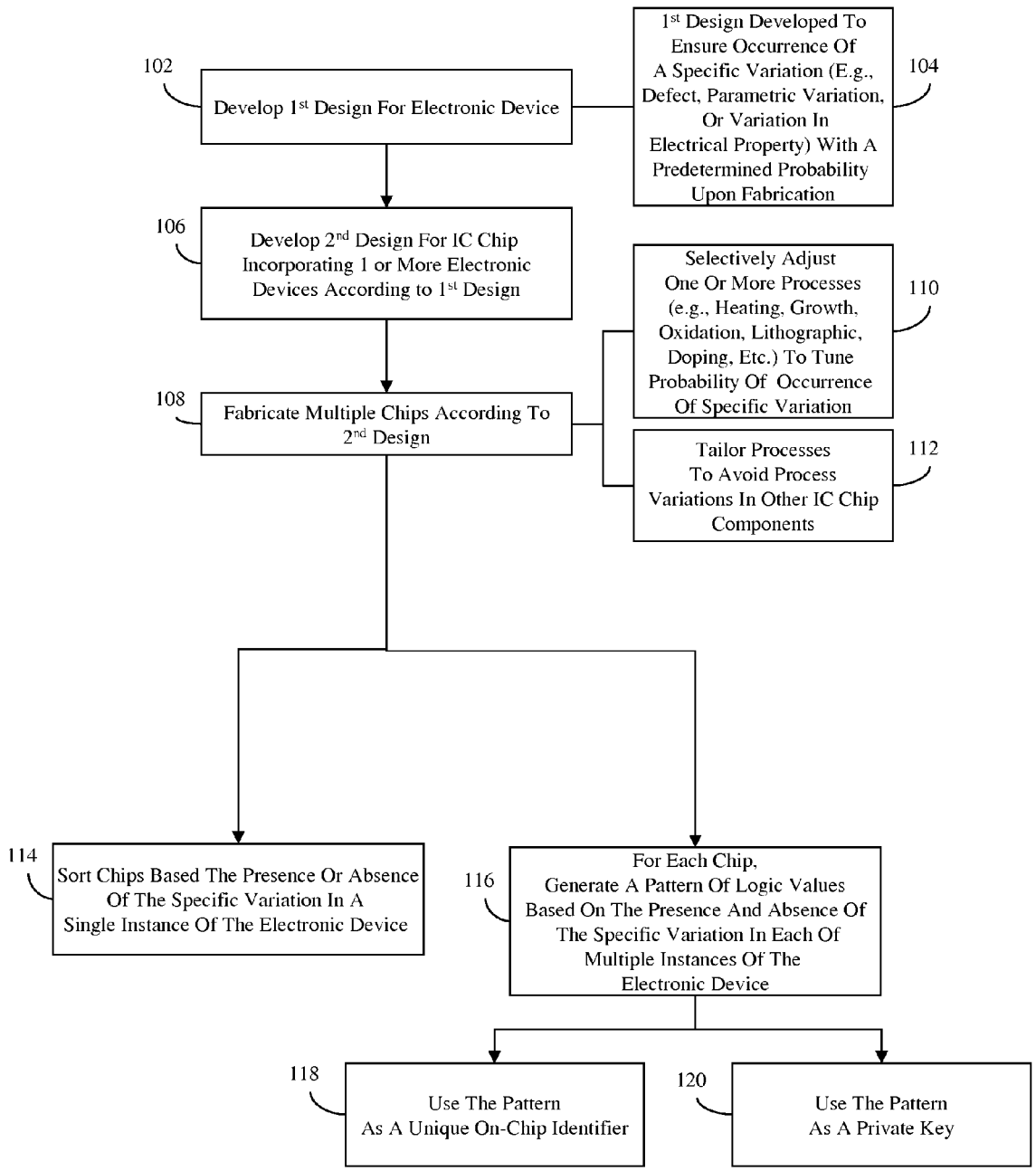
FIG. 1 is a flow diagram illustrating embodiments of the method of the present invention.

More particularly, referring to FIG. 1, disclosed are embodiments of the integrated circuit chip personalization method. The method embodiments comprise developing a first design for a particular electronic device (e.g., a semiconductor device, such as a field effect transistor, bipolar transistor, a resistor, a capacitor, etc.) (102). Next, the method embodiments comprise developing a second design for an integrated circuit chip that incorporates one or more instances of the electronic device according to the first design (106). Multiple integrated circuit chips are then fabricated according to the second design (108).

It should be noted that the first design process (102) is performed such that upon chip fabrication at process (108) and without further processing, a specific variation occurs in any given instance of the electronic device with a predetermined probability (104). The specific variation in the electronic device can comprise, for example, a detectable defect (e.g., a dislocation, short, open, etc.), a variation in a measurable parameter (e.g., a variation in switching frequency, threshold voltage, channel lengths and widths, delay, leakage current, source and drain currents, etc.), or a variation in some other measurable electrical property (e.g., a variation in resistance, capacitance, transconductance, etc.). The predetermined probability at which the specific variation will occur is a function of the first design (i.e., of the design of the particular electronic device). Preferably, the predetermined probability is approximately 50% such that the occurrence of the specific variation is considered random or pseudo-random. However, it is anticipated that other distributions may be desirable depending upon the application. For example, it may be desirable to have the specific variation occur approximately 40%, 30%, 25%, etc. of the time.

Optionally, this predetermined probability can also be a function of one or more processes used during chip fabrication (110). That is, the method embodiments can further comprise, during chip fabrication (at process (108)), selectively adjusting at least one process in order to selectively tune the predetermined probability that the specific variation will occur in any given instance of the electronic device and, thereby, to achieve a desired hardware distribution. Thus, for example, the first design generated at process (102) may ensure that the specific variation occurs approximately 40% of the time; however, by selectively adjusting one or more of the processing steps at process (110) this predetermined probability can be tuned to 50%.

Figure 2A:
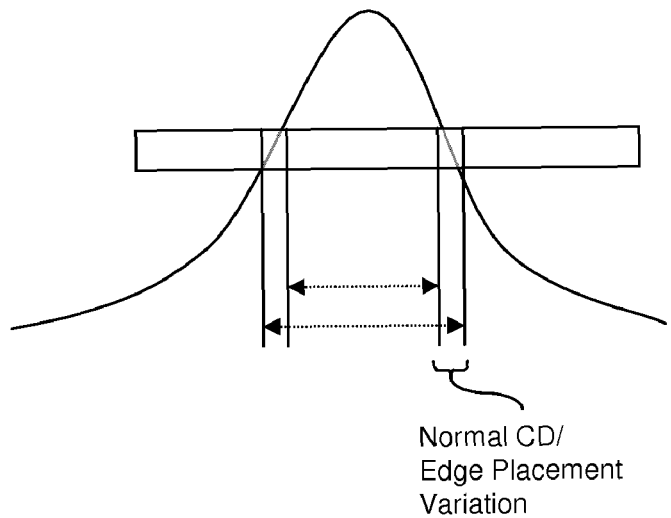
FIG. 2A is a diagram illustrating normal edge placement variability in lithographic processing.
Figure 2B:
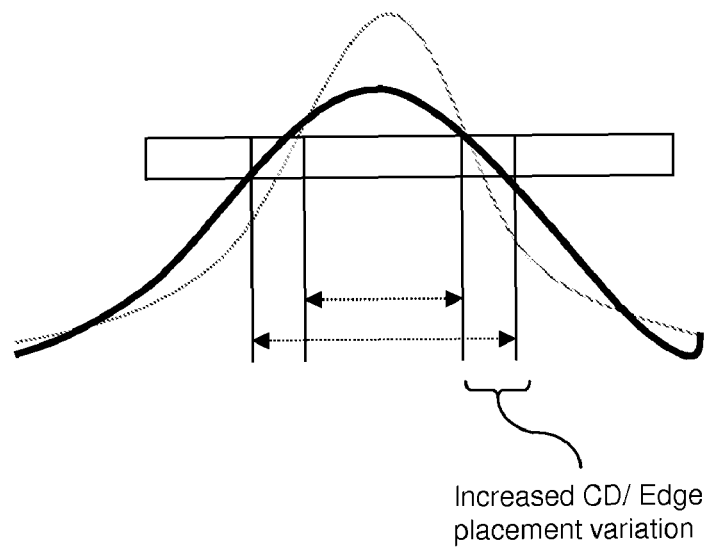
FIG. 2B is a diagram illustrating deliberately degraded edge placement variability in lithographic processing.

Exemplary processes that can be selectively adjusted in this manner can include, but are not limited to, thermal anneals or heating processes, growth processes, oxidation processes, doping processes, and lithographic processes. For example, a lithographic process can be selectively adjusted by deliberately degrading the quality of a projected image (e.g., by adjusting the lithographic equipment or the photomask used) and, thereby, increasing edge placement variability, which commensurately causes a variation in the electrical output of a component or components on the chip. That is, depending upon the electronic device being formed, edge placement variability can result in a defect (e.g., a dislocation, short, open, etc.), a parametric variation (e.g., a variation in switching frequency, threshold voltage, channel lengths and widths, delay, leakage current, source and drain currents, etc.), or a variation in an electrical property (e.g., a variation in resistance, capacitance, transconductance, etc.). More specifically, there is inherent variation in lithographic processing. FIG. 2A provides an illustration of normal edge placement variability in the presence of a good aerial image (i.e., in the presence of current state of the art best possible contrast). By designing the optical-proximity-correction (OPC) to reduce contrast, by selecting illumination conditions not optimized to specific geometries and/or by reducing the quality of local masks, the quality of the projected image can be degraded, thereby increasing the variability of edge placement. FIG. 2B provides an illustration of increased edge placement variability in the presence of a poor aerial image (i.e., in the presence of degraded contrast). It should be noted, however, that any process, which is selectively adjusted to tune the probability of occurrence of the specific variation in the electronic device, should also be tailored to avoid such process variations in other components of the chip (112).

Following chip fabrication (at process (108)), if a single instance of the particular electronic device is formed on each chip, the presence (or absence) of the specific variation can be used for chip sorting (114). If multiple instances of the particular electronic device are formed on each chip, as described above, the multiple instances of the electronic device can be used to generate a unique pattern of logic values (or analog signals) indicative of some of the multiple instances of the electronic device having the specific variation and others of the multiple instances of electronic device not having the specific variation (116). That is, the method can further comprise testing each of multiple instances of the electronic device to detect the presence (or absence) of the specific variation. The results of the testing can be used to generate such a unique pattern of logic values (or of analog signals) and this unique pattern can function, for example, as an on-chip identifier (118) or a private key (120).

It should be noted that data preparation can be incorporated into the above method embodiment in the design and/or fabrication process steps (102)-(112).

Figure 3:
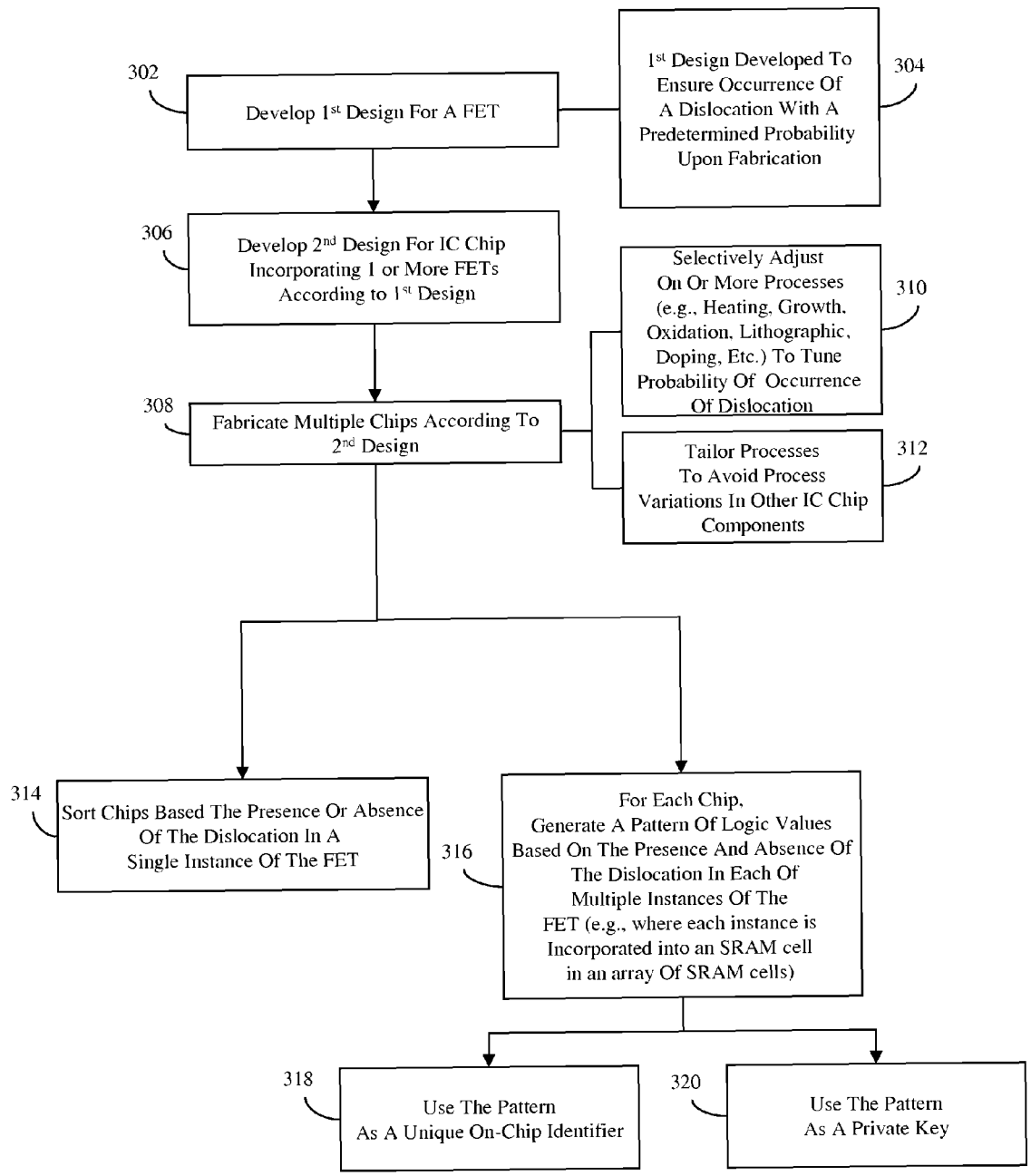
FIG. 3 is a flow diagram illustrating one exemplary embodiment of the method of the present invention.

Referring to FIG. 3, one particular embodiment of the chip personalization method, according to the present invention, comprises developing a first design for a field effect transistor (FET) (302). Particularly, this first design process (302) is performed such that upon fabrication (at subsequent process (308)) and without further processing, a dislocation occurs, with a predetermined probability in any given instance of the FET, within the FET channel region between the source/drain regions (304).

Figure 4:
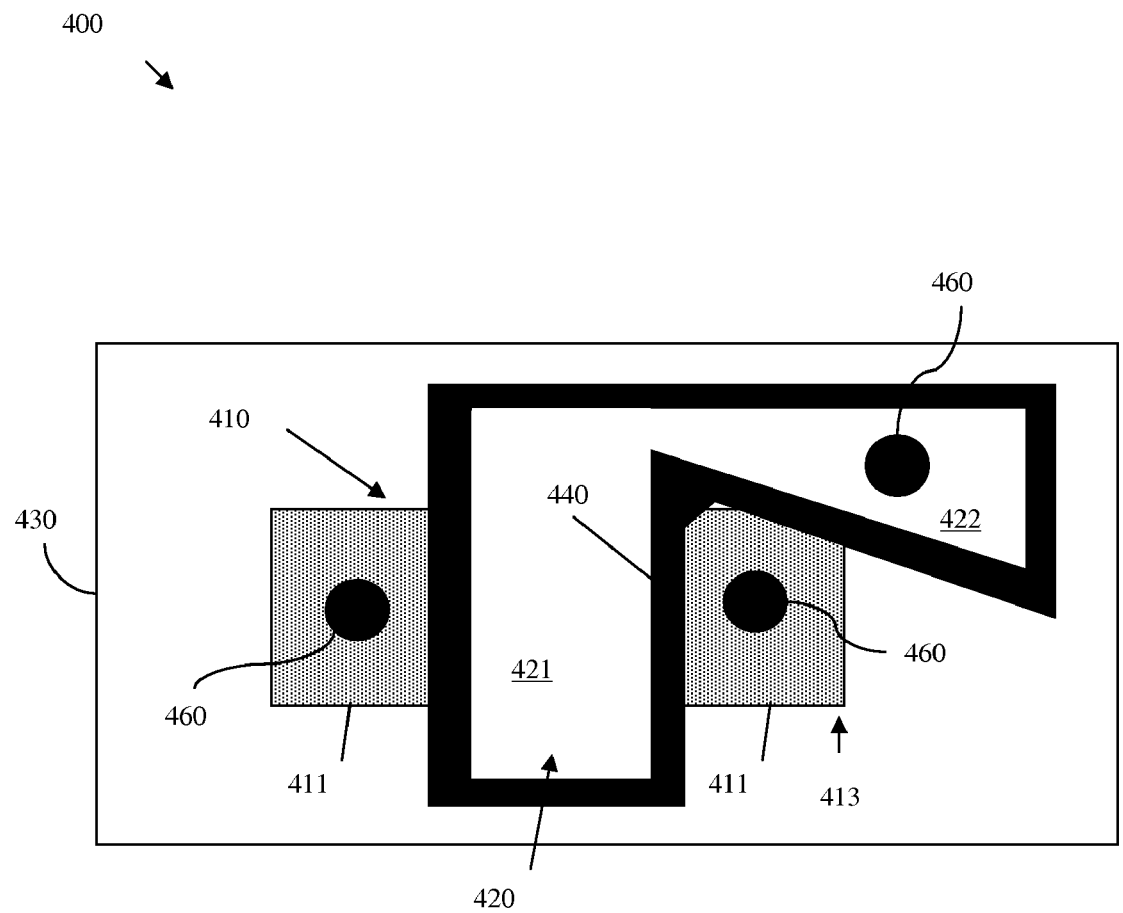
FIG. 4 is a top view diagram illustrating an embodiment of a field effect transistor structure of the present invention.

For example, the first design can be developed such that the FET 400 comprises a planar, n-type or p-type transistor, having a unique gate structure 420 (see FIG. 4, which provides a top view of such a FET 400). This FET 400 can comprise a single crystalline semiconductor layer 410 (e.g., a silicon layer) comprising source/drain regions 411 and a channel region 412 (shown in FIGS. 5 and 6) between the source/drain regions 411. The source/drain regions 411 can be appropriately doped with n-type or p-type dopants, depending upon the conductivity type of the transistor 400. A trench isolation region 430 can border the semiconductor layer 410 so as to define the FET area. This trench isolation region 430 can comprise a conventional shallow trench isolation (STI) region filled, for example, with silicon dioxide ($SiO_2$).

Additionally, the FET 400 can comprise a unique gate structure 420 positioned above the semiconductor layer 410 and the trench isolation region 430. This gate structure 420 can comprise a main portion 421 above and traversing the channel region 412 (see FIGS. 5 and 6, which provide cross-section views illustrating the main portion 421 of the gate structure 420 above the FET channel region 412). Referring again to FIG. 4, the gate structure 420 can also comprise an additional portion 422 above the trench isolation region 430. This additional portion 422 can extend outward from the main portion 421 adjacent to a side of the semiconductor layer 410 towards (and optionally beyond) one end 413 of a source/drain region 411. As designed, this field effect transistor 400 has a predetermined probability of having a dislocation 450 in the channel region 412 extending between the source/drain regions 411 (as shown in FET structure 400a of FIG. 5) and, thus, also a predetermined probability of not having such a dislocation (as shown in FET structure 400b of FIG. 6). This dislocation 450 effectively functions as a "pipe" connecting and allowing current flow between the source/drain regions 411 in the absence of gate 420 activation. This predetermined probability is a function of the design of the transistor 400 (as developed at process (302)) and, optionally, of one or more process steps used to form the chip according to the design (at process (308)).

Figure 5:
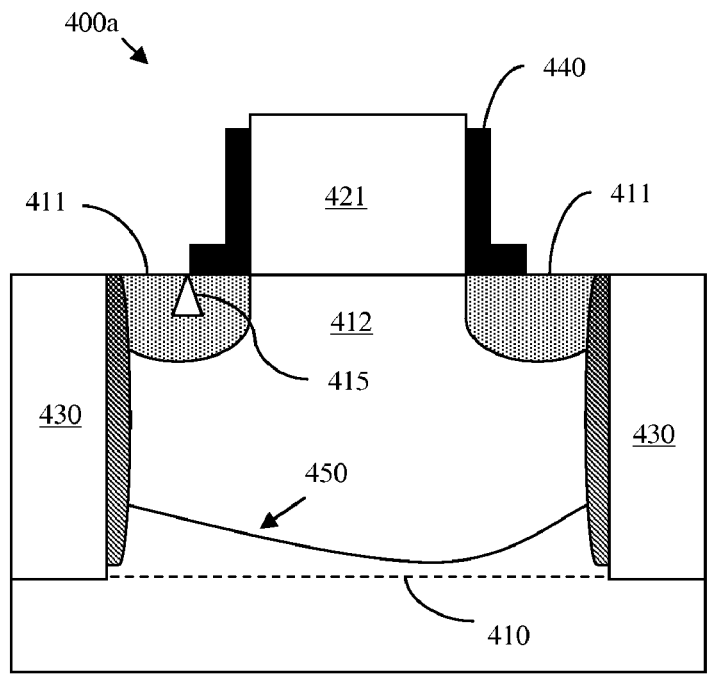
FIG. 5 is a cross-section view diagram of the field effect transistor of FIG. 4.
Figure 6:
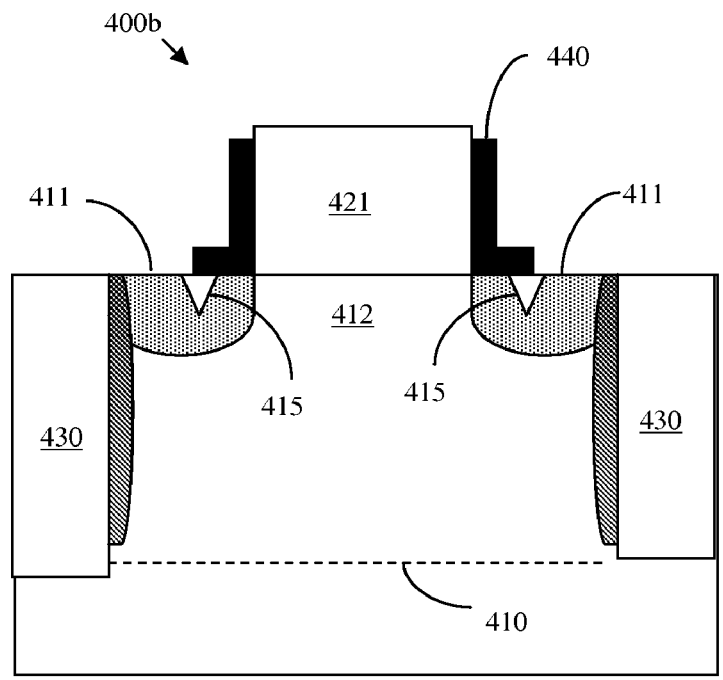
FIG. 6 is an alternative cross-section view diagram of the field effect transistor of FIG. 4.
Figure 7:
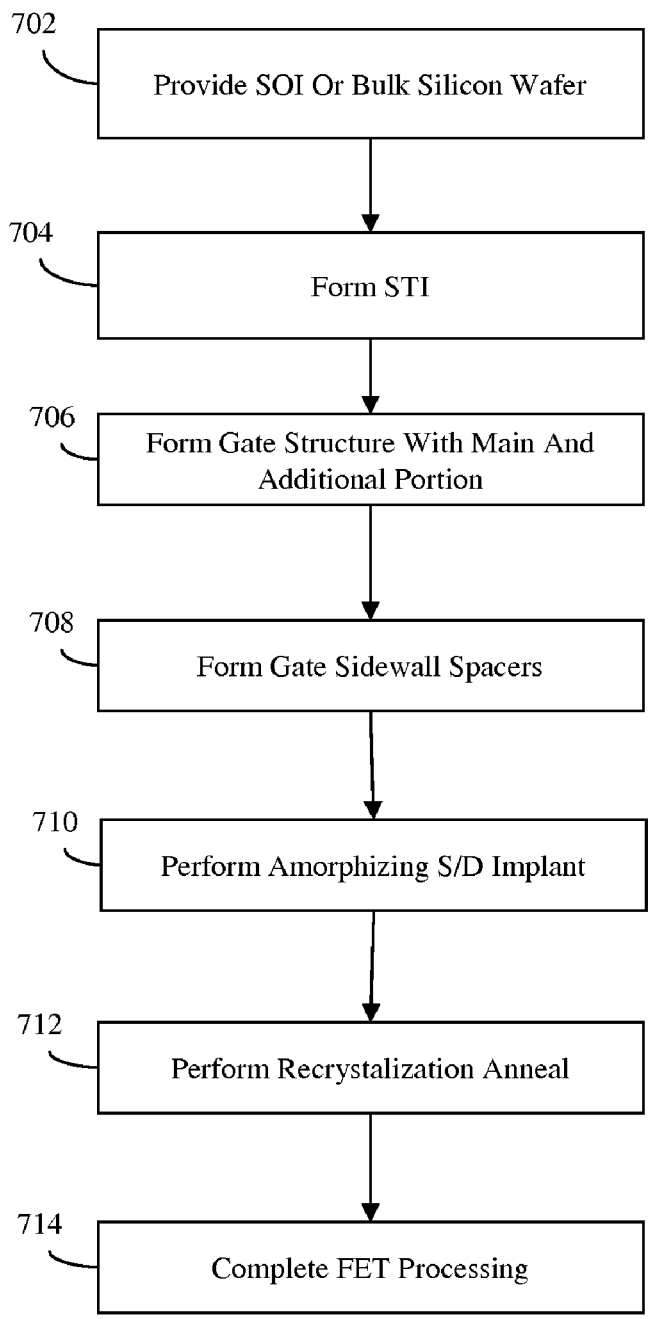
FIG. 7 is a flow diagram illustrating an embodiment of a method of forming the field effect transistor of FIG. 4.

More particularly, the predetermined probability that the dislocation 450 of FIG. 5 will occur is a function of the position and shape of the additional portion 422 of the gate structure 420 relative to the main portion 421 and, thereby the position and shape of gate sidewall spacers 440, during fabrication. Specifically, referring to FIG. 7, a FET 400 can be fabricated using a silicon-on-insulator (SOI) or bulk silicon wafer 401 (702, see FIG. 8).

Figure 8:
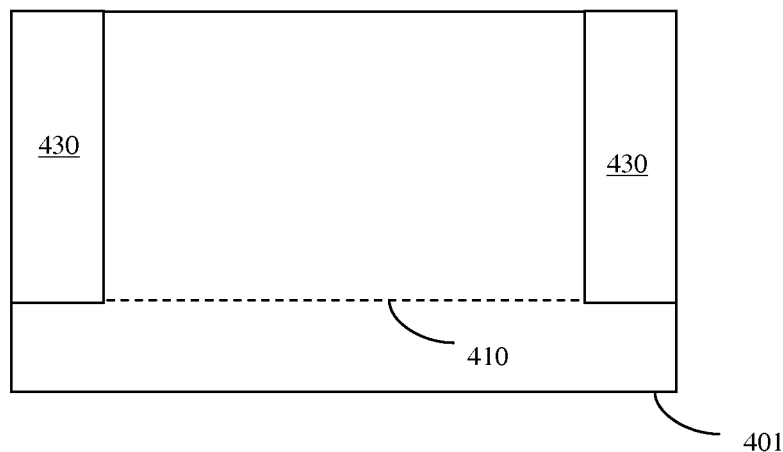
FIG. 8 is a cross-section diagram illustrating a partially completed field effect transistor formed according to the method of FIG. 7.

An STI region 430 can be formed, e.g., using conventional STI formation techniques (704, see FIG. 8). This STI 430 can define the shape of the semiconductor layer 410 within which the FET 400 will be formed.

Figure 9:
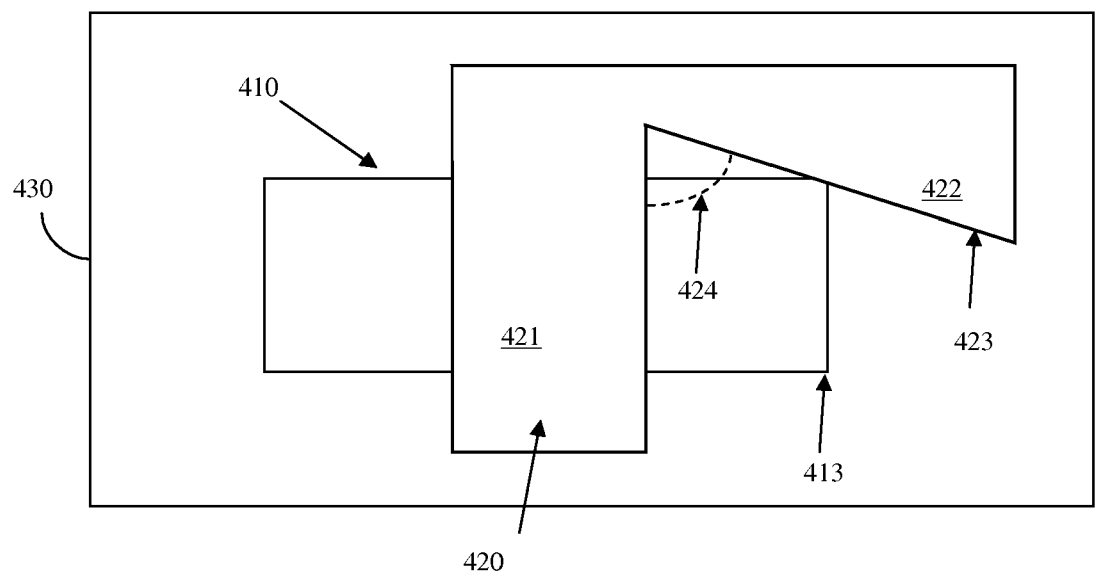
FIG. 9 is a top view diagram illustrating a partially completed field effect transistor formed according to the method of FIG. 7.

Next, a gate structure 420, having both the main portion 421 and the additional portion 422, as described above, can be formed (706, see the top view illustration of FIG. 9). That is, a thin gate dielectric layer (e.g., a $SiO_2$ layer or other suitable gate dielectric layer) can be deposited. Then, a blanket gate conductor layer (e.g., a polysilicon layer or other suitable gate conductor layer) can be deposited on top of the gate dielectric layer. The gate dielectric layer-gate conductor layer stack can then be lithographically patterned such that the resulting gate structure 420 comprises the main portion 421 traversing a designated channel region of the semiconductor layer 410. This lithographic patterning process can further be performed such that the resulting gate structure 420 comprises the additional portion 422 above the trench isolation region 430 and extending outward from the main portion 421 adjacent to the semiconductor layer 410 towards (and optionally beyond) an end 413 of one of the designated source/drain regions. More specifically, the gate structure 420 can be lithographically patterned so that the additional portion 422 has an edge 423 extending outward from the main portion 421 towards the end 413 at a predetermined angle 424 shown in FIG. 9 that is chosen to direct the stress/strain across the channel (e.g., an angle that is less than 90 degrees).

Figure 10:
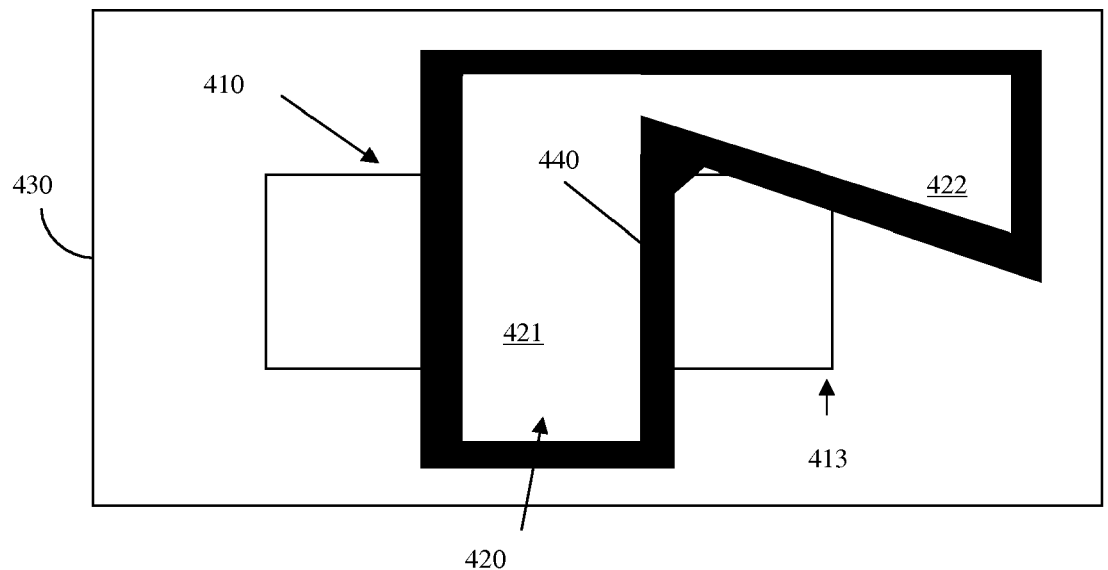
FIG. 10 is a top view diagram illustrating a partially completed field effect transistor formed according to the method of FIG. 7.
Figure 11:
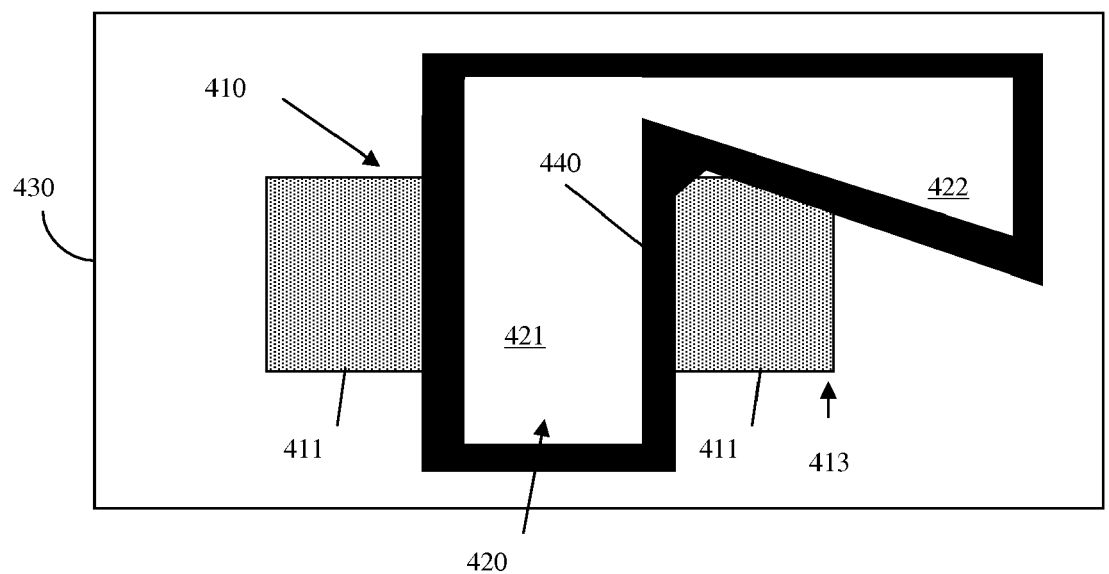
FIG. 11 is a top-view diagram illustrating a partially completed field effect transistor formed according to the method of FIG. 7.

After the gate structure 420 is formed (at process (706)), gate sidewall spacers 440 can be formed, e.g., using conventional processing techniques, along the sidewalls of both the main portion 421 and additional portion 422 of the gate structure 420 (708, see FIG. 10). Next, n-type or p-type dopants can be implanted, e.g., using conventional processing techniques, to form the source/drain regions 411 (710, see FIG. 11). The gate sidewall spacers 440 and isolation region 430 effectively define the implant region.

The implant process (i.e., process (710)) will result in the doped portion of the semiconductor layer 410 (i.e., the source/drain regions 411) being amorphized. Consequently, a high temperature anneal process is performed in order to recrystallize the semiconductor layer 410 and, specifically, the source/drain regions 411 (712). The resulting FET structure will inevitably have recrystallization defects 415 (i.e., stacking faults, dislocations or irregularities) within the single crystalline semiconductor layer 410 at the edge of the sidewall spacers 440 (e.g., see resulting FET structure 400b of FIG. 6). Furthermore, during the high temperature anneal, the sidewall spacers 440 along the additional portion 422 of the gate structure 420 impart stress on the adjacent source/drain region 411. As a result of this imparted stress, a small dislocation 415, such as that illustrated in FIG. 6, can further migrate to a lower stress location at the lower corner of the STIs 430 and can drag the implanted dopant along with it. Thus, the resulting FET structure may further have a larger dislocation 450 that extends from the source/drain regions 411 across the channel region 412 (see the resulting FET structure 400a of FIG. 5). Due to the shape and position of the additional portion 422 of the gate structure 420 (and, thereby, the shape and position of the gate sidewall spacers 440) this larger dislocation 450 will only occur with some predetermined probability. Preferably, the shape and position of the additional portion 422 of the gate structure 420 are selected such that the predetermined probability is approximately 50%, thereby making the occurrence of the dislocation 450 random or pseudo-random. However, it is anticipated that other distributions may be desirable depending upon the application. For example, it may be desirable to have the larger dislocation 450 occur approximately 40%, 30%, 25%, etc. of the time.

Finally, following the recrystallization anneal (i.e., process (712)), additional conventional FET processing will be performed in order to complete the FET structure (714). This additional processing can include, but is not limited to, halo implantation, source/drain extension implantation, source/drain implantation, gate sidewall spacer formation, silicide formation, interlayer dielectric deposition, contact 460 formation, etc.).

Referring again to FIG. 3, this method embodiment further comprises, after developing the FET design (at process (302)) developing a second design for an integrated circuit chip that incorporates one or more instances of the field effect transistor according to the first design (306). Multiple integrated circuit chips are then fabricated according to the second design (308). As mentioned above, the first design (developed (at process (302)) such that upon subsequent fabrication (at process (308)) and without further processing, a dislocation 450, such as that illustrated in FIG. 5, occurs with a predetermined probability in any given each instance of the field effect transistor across the channel region between the source/drain regions (304). The predetermined probability is a function of the first design (i.e., of the design of the particular field effect transistor). Optionally, this predetermined probability can also be a function of one or more processes used during chip fabrication (310). That is, this method embodiment can further comprise, during fabrication (at process (308)), adjusting at least one process in order to selectively tune the predetermined probability that the dislocation will occur and, thereby, to achieve a desired hardware distribution. Thus, for example, the first design generated at process (302) may ensure that the dislocation occurs approximately 40% of the time; however, by selectively adjusting one or more of the processing steps (at process (310)) this predetermined probability can be tuned to 50%.

Exemplary processes that can be selectively adjusted (at process (310)) can include, but are not limited to, thermal anneals or heating processes, growth processes, oxidation processes, doping processes, and lithographic processes. For example, the lithographic process used to form the gate structure 420 can be selectively adjusted by deliberately degrading the quality of a projected image (e.g., by adjusting the lithographic equipment or the photomask used) and, thereby increasing edge placement variability (as discussed above with regard to FIGS. 2A and 2B). Increasing edge placement variability of the additional portion 422 may in turn increase the probability that the dislocation 450 of FIG. 5 will occur. However, any process, which is selectively adjusted to tune the probability of occurrence of the dislocation 450, should also be tailored to avoid such process variations in other components of the chip (312).

As with the previously described method embodiments, after chip fabrication (at process (308)), if a single instance of the field effect transistor 400, as described above, is formed on each chip the presence (or absence) of the larger dislocation 450 can be used for chip sorting (314). However, if multiple instances of the field effect transistor 400 are formed on each chip, the multiple instances of the field effect transistor 400 can be used to generate a unique pattern of logic values (or of analog signals) indicative of some of the multiple instances of the field effect transistor having the dislocation 450 (e.g., as illustrated FET structure 400a of FIG. 5) and others of the multiple instances of the field effect transistor not having the dislocation (e.g., as illustrated in FET structure 400b of FIG. 6) (316). That is, the method can further comprise testing each of multiple instances of the field effect transistor 400 directly or testing electronic devices containing the field effect transistors 400 to detect the presence (or absence) of dislocations 450. The results of the testing can be used to generate a unique pattern of logic values (or of analog signals), which can function, for example, as an on-chip identifier (318) or a private key (320).

It should be noted that data preparation can be incorporated into the above method embodiment in the design and/or fabrication process steps (302)-(312).

Figures 12A, 12B, 12C:
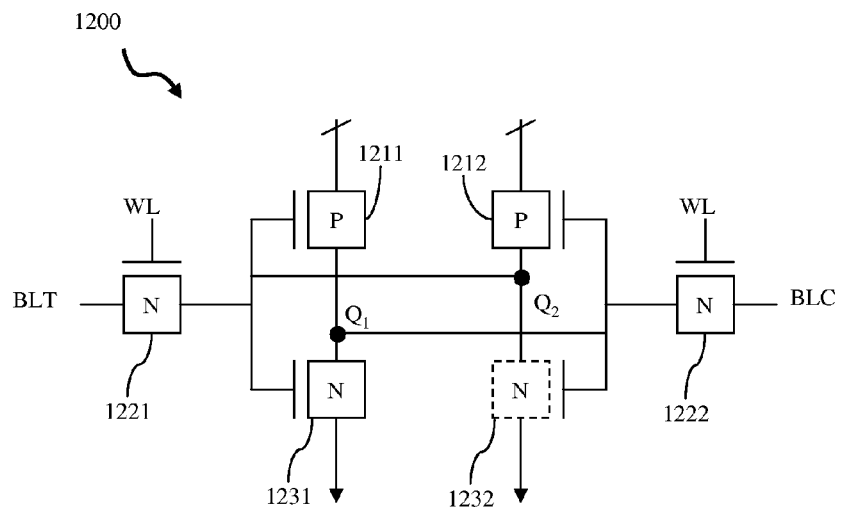
FIG. 12A is a schematic diagram illustrating an exemplary six-transistor static random access memory (SRAM) cell.
FIG. 12B is a table illustrating readouts for the cell of FIG. 12A when a dislocation is not present.
FIG. 12C is a table illustrating readouts for the cell of FIG. 12A when a dislocation is present.

Referring to FIG. 12, also disclosed is an exemplary six-transistor (6T) static random access memory (SRAM) cell that incorporates the above-described field effect transistor 400 of FIG. 4 and that can be readout in order to test for the occurrence of the dislocation. An SRAM array containing multiple such SRAM cells 1200 can be used for chip personalization (e.g., based on a list of 0s or 1s read out from the SRAM cells in the array). FIG. 12A is a schematic diagram illustrating a conventional static random access memory (SRAM) cell 1200 comprising two pull-up pFETs 1211, 1212, two pass-gate nFETs 1221, 1222 and two pull-down nFETs 1231, 1232. In this SRAM cell 1200 nodes $Q_1$ and $Q_2$ are each connected to ground through pull-down nFETS 1231, 1232, respectively. Personalization can be achieved by designing/configuring one of the six transistors in each SRAM cell 1200 (e.g., the pull-down nFET 1232 or a selected one of the other transistors) in the same manner as FET 400 of FIG. 4 such that, upon fabrication and without further processing, a dislocation may occur with a predetermined probability within that FET.

Specifically, to determine whether a single, specially configured, FET 400 in any given SRAM cell 1200 in an SRAM array has a dislocation, a readout process is performed. For example, a blanket write can be performed. That is, all SRAM cells 1200 in an SRAM array can be written to the same 0 state. When all of the SRAM cells are written to the same 0 state, they should all read out as 0. Next, another blanket write can be performed to write all SRAM cells 1200 in the array to the same 1 state. In an exemplary case where the specially configured FET 400 is a pull-down n-FET (e.g., n-FET 1232), if a dislocation is not present in the pull-down nFET 1232, then when written to 1, the SRAM cell 1200 will readout as 1 (as illustrated in FIG. 12B). However, if a dislocation is present in the pull-down nFET 1232, the node $Q_2$ will be continuously connected to ground. Thus, rather than reading out as a 1, the SRAM cell 1200 with the pull-down nFET dislocation will still readout as 0 (as illustrated in FIG. 12C).

If a single instance of an SRAM cell 1200 with a single specially configured FET 400 is located on each chip that instance can be tested and the readout logic value (1 or 0) can be captured and used for sorting chips based on the presence or absence of the dislocation. However, if multiple instances of the SRAM cell 1200 are configured in an SRAM array, each instance can be tested in order to capture (i.e., generate) a pattern of logic values (i.e., a bit pattern of 1's and 0's) that are indicative, as discussed above, of some of the multiple instances of the SRAM cell having a single specially configured FET 400 with a dislocation and others of the multiple instances of the SRAM cell having a single specially configured FET 400 without the dislocation. This unique pattern of logic values can function, for example, as an on-chip identifier or a private key.

Alternatively, rather than generating a pattern of logic values directly from cell read out, if the SRAM cells 1200 are configured in an array, the addresses of those cells having a single specially configured FET 400 with the dislocation can be collected (or the addresses of those cells having a single specially configured FET 400 without the dislocation can be collected) and the collected addresses can be used as the on-chip identifier or private key.

Figure 13:
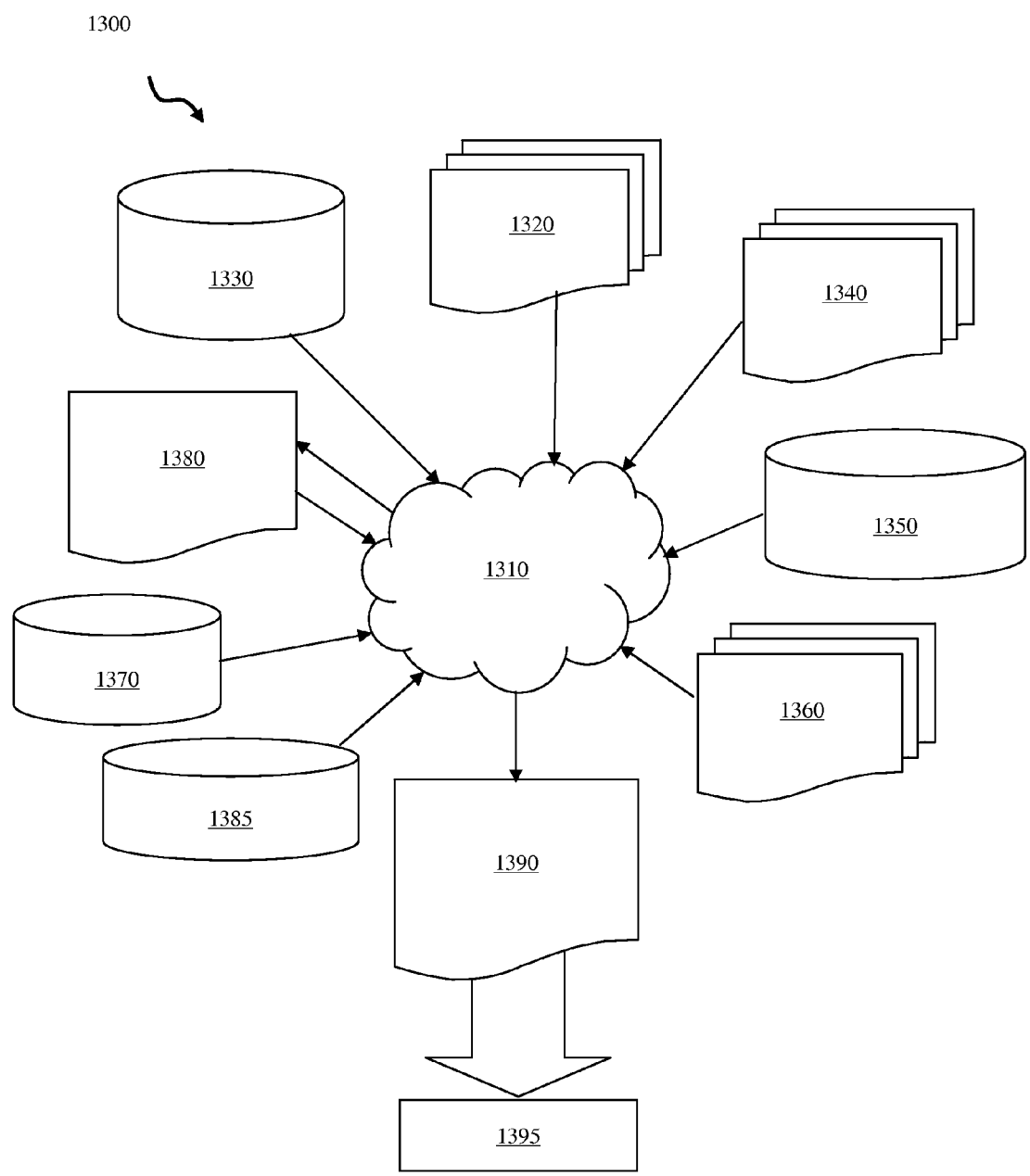
FIG. 13 is a flow diagram of a design process used in semiconductor design, manufacture, and/or test.

Finally, also disclosed are embodiments of a design structure tangibly embodied in a machine readable medium for designing, manufacturing, or testing an integrated circuit, the design structure comprising an integrated circuit chip comprising one or more instances of the field effect transistor, described above. More Specifically, FIG. 13 shows a block diagram of an exemplary design flow 1300 used for example, in semiconductor IC logic design, simulation, test, layout, and manufacture. Design flow 1300 includes processes, machines and/or mechanisms for processing design structures or devices to generate logically or otherwise functionally equivalent representations of the design structures and/or devices described above and shown in FIGS. 4-6 and 12. The design structures processed and/or generated by design flow 1300 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1300 may vary depending on the type of representation being designed. For example, a design flow 1300 for building an application specific IC (ASIC) may differ from a design flow 1300 for designing a standard component or from a design flow 1300 for instantiating the design into a programmable array, for example a programmable gate array (PGA) or a field programmable gate array (FPGA) offered by Altera® Inc. or Xilinx® Inc.

FIG. 13 illustrates multiple such design structures including an input design structure 1320 that is preferably processed by a design process 1310. Design structure 1320 may be a logical simulation design structure generated and processed by design process 1310 to produce a logically equivalent functional representation of a hardware device. Design structure 1320 may also or alternatively comprise data and/or program instructions that when processed by design process 1310, generate a functional representation of the physical structure of a hardware device. Whether representing functional and/or structural design features, design structure 1320 may be generated using electronic computer-aided design (ECAD) such as implemented by a core developer/designer. When encoded on a machine-readable data transmission, gate array, or storage medium, design structure 1320 may be accessed and processed by one or more hardware and/or software modules within design process 1310 to simulate or otherwise functionally represent an electronic component, circuit, electronic or logic module, apparatus, device, or system such as those shown in FIGS. 4-6 and 12. As such, design structure 1320 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1310 preferably employs and incorporates hardware and/or software modules for synthesizing, translating, or otherwise processing a design/simulation functional equivalent of the components, circuits, devices, or logic structures shown in FIGS. 4-6 and 12 to generate a netlist 1380 which may contain design structures such as design structure 1320. Netlist 1380 may comprise, for example, compiled or otherwise processed data structures representing a list of wires, discrete components, logic gates, control circuits, I/O devices, models, etc. that describes the connections to other elements and circuits in an integrated circuit design. Netlist 1380 may be synthesized using an iterative process in which netlist 1380 is resynthesized one or more times depending on design specifications and parameters for the device. As with other design structure types described herein, netlist 1380 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 1310 may include hardware and software modules for processing a variety of input data structure types including netlist 1380. Such data structure types may reside, for example, within library elements 1330 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1340, characterization data 1350, verification data 1360, design rules 1370, and test data files 1385 which may include input test patterns, output test results, and other testing information. Design process 1310 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1310 without deviating from the scope and spirit of the invention. Design process 1310 may also include modules for performing standard circuit design processes such as timing analysis, verification, design rule checking, place and route operations, etc.

Design process 1310 employs and incorporates logic and physical design tools such as HDL compilers and simulation model build tools to process design structure 1320 together with some or all of the depicted supporting data structures along with any additional mechanical design or data (if applicable), to generate a second design structure 1390. Design structure 1390 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 1320, design structure 1390 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 4-6 and 12. In one embodiment, design structure 1390 may comprise a compiled, executable HDL simulation model that functionally simulates the devices shown in FIGS. 4-6 and 12.

Design structure 1390 may also employ a data format used for the exchange of layout data of integrated circuits and/or symbolic data format (e.g. information stored in a GDSII (GDS2), GL1, OASIS, map files, or any other suitable format for storing such design data structures). Design structure 1390 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 4-6 and 12. Design structure 1390 may then proceed to a stage 1395 where, for example, design structure 1390: proceeds to tape-out, is released to manufacturing, is released to a mask house, is sent to another design house, is sent back to the customer, etc.

It should be understood that the corresponding structures, materials, acts, and equivalents of all means or step plus function elements in the claims below are intended to include any structure, material, or act for performing the function in combination with other claimed elements as specifically claimed. Additionally, it should be understood that the above-description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. Well-known devices and processing techniques are omitted in the above-description so as to not unnecessarily obscure the embodiments of the invention.

Finally, it should also be understood that the terminology used in the above-description is for the purpose of describing particular embodiments only and is not intended to be limiting of the invention. For example, as used herein, the singular forms "a", "an" and "the" are intended to include the plural forms as well, unless the context clearly indicates otherwise. Furthermore, as used herein, the terms "comprises", "comprising," and/or "incorporating" when used in this specification, specify the presence of stated features, integers, steps, operations, elements, and/or devices, but do not preclude the presence or addition of one or more other features, integers, steps, operations, elements, devices, and/or groups thereof.

Therefore, disclosed above are embodiments of a method for randomly personalizing chips during fabrication, a personalized chip structure and a design structure for such a personalized chip structure. The embodiments use electronic device design as well as manufacturing processes to randomly or pseudo-randomly create a specific variation (e.g., a defect, a parametric variation, a variation in an electrical property, etc.) in one or more instances of a particular electronic device formed on each chip. The device design and manufacturing processes are tuned so that the specific variation occurs with some predetermined probability, resulting in a desired distribution of hardware characteristics, preferably confined to a specific region, and, thereby personalizing each chip. The resulting personalized chips can be used for modal distribution of chips. For example, chips can be personalized to allow sorting when a single chip design can be used to support multiple applications. The resulting personalized chips can also be used for random number generation for creating unique on-chip identifiers, private keys, etc. Alternatively, the resulting personalized chip can be used for inspection (e.g., reading the chip identification at in-line inspection), rather than reading a stream of digital values. Additionally, personalized chip function can be used to control chip operation or to choose between feature sets. For example, one chip can be designed to support two different applications, with the same CPU, but two different interfaces. Each chip would be personalized for one of the applications. Finally, the resulting personalized chips can be tailored by design to work with an established and fixed fabrication process or in combination with process modification.

What is claimed is:

1. A method for fabricating multiple integrated circuit chips, said method comprising:
    developing a first design for a particular electronic device such that, in any instance of said particular electronic device that will be formed according to said first design, there is a predetermined probability that said particular electronic device will have a specific variation,
        said predetermined probability being less than 100%, and
        said specific variation comprising one of a specific defect and a specific parameter;
    developing a second design for an integrated circuit chip that incorporates at least one instance of said particular electronic device according to said first design;

fabricating said multiple integrated circuit chips according to said second design such that each chip comprises said at least one instance of said particular electronic device formed according to said first design; and during said fabricating, selectively adjusting at least one process so as to selectively change said predetermined probability to a different predetermined probability such that on any of said chips said at least one instance of said particular electronic device has said different predetermined probability of having said specific variation.

2. The method of claim 1, said selectively adjusting of said at least one process comprising selectively adjusting one of a heating process, a growth process, an oxidation process, a lithographic process, and a doping process.

3. The method of claim 2, said selectively adjusting of said lithographic process comprising deliberately degrading a quality of a projected image to increase variability of edge placement.

4. The method of claim 1, said specific defect comprising one of a dislocation, a short and an open and said specific parameter comprising one of the following:
   a measurable parameter comprising one of switching frequency, threshold voltage, channel lengths and widths, delay, leakage current and source and drain currents; and
   a measurable electrical property comprising one of resistance, capacitance, and transconductance.

5. The method of claim 1, further comprising sorting said chips based on the presence or absence of said specific variation.

6. The method of claim 1, further comprising, for each chip, testing each of multiple instances of said electronic device to generate a pattern of logic values indicative of some of said multiple instances of said electronic device having said specific variation and others of said multiple instances of said electronic device not having said specific variation.

7. The method of claim 6, further comprising using said pattern of logic values as at least one of an on-chip identifier and a private key.

8. The method of claim 1, said predetermined probability being approximately 50%.

9. A method for fabricating multiple integrated circuit chips, said method comprising:
   developing, by a computer, a first design for a particular electronic device such that, in any instance of said particular electronic device that will be formed according to said first design, there is a predetermined probability that said particular electronic device will have a specific variation,
   said predetermined probability being less than 100%, and
   said specific variation comprising one of a specific defect and a specific parameter;
   developing, by said computer, a second design for an integrated circuit chip that incorporates at least one instance of said particular electronic device according to said first design;
   fabricating said multiple integrated circuit chips according to said second design such that each chip comprises said at least one instance of said particular electronic device formed according to said first design; and
   during said fabricating, selectively adjusting at least one process so as to selectively change said predetermined probability to a different predetermined probability such that on any of said chips said at least one instance of said particular electronic device has said different predetermined probability of having said specific variation.

10. A method for fabricating multiple integrated circuit chips, said method comprising:
    developing a first design for a particular electronic device such that, in any instance of said particular electronic device that will be formed according to said first design, there is a predetermined probability that said particular electronic device will have a specific variation,
    said predetermined probability being less than 100%, and
    said specific variation comprising one of a specific defect and a specific parameter;
    developing a second design for an integrated circuit chip that incorporates at least one instance of said particular electronic device according to said first design;
    fabricating multiple integrated circuit chips according to said second design such that each chip comprises said at least one instance of said particular electronic device formed according to said first design; and
    during said fabricating, selectively adjusting at least one process so as to selectively change said predetermined probability to a different predetermined probability such that on any of said chips said at least one instance of said particular electronic device has said different predetermined probability of having said specific variation, said different predetermined probability being less than said predetermined probability.

11. The method of claim 10, said selectively adjusting of said at least one process comprising selectively adjusting one of a heating process, a growth process, an oxidation process, a lithographic process, and a doping process and said selectively adjusting of said lithographic process comprising deliberately degrading a quality of a projected image to increase variability of edge placement.

12. The method of claim 10, further comprising sorting said chips based on the presence or absence of said specific variation.

13. The method of claim 10, said specific defect comprising one of a dislocation, a short and an open and said specific parameter comprising one of the following:
    a measurable parameter comprising one of switching frequency, threshold voltage, channel lengths and widths, delay, leakage current and source and drain currents;
    a measurable electrical property comprising one of resistance, capacitance, and transconductance.

14. The method of claim 10, further comprising:
    for each chip, testing each of multiple instances of said electronic device to generate a pattern of logic values indicative of some of said multiple instances of said electronic device having said specific variation and others of said multiple instances of said electronic device not having said specific variation; and
    using said pattern of logic values as at least one of an on-chip identifier and a private key.

15. The method of claim 10, said predetermined probability being approximately 50% and said different predetermined probability being no greater than 40%.

16. A method for fabricating multiple integrated circuit chips, said method comprising:
    developing a first design for a particular electronic device such that, in any instance of said particular electronic device that will be formed according to said first design, there is a predetermined probability that said particular electronic device will have a specific defect, said predetermined probability being less than 100%;
    developing a second design for an integrated circuit chip that incorporates at least one instance of said particular electronic device according to said first design;

fabricating multiple integrated circuit chips according to said second design such that each chip comprises said at least one instance of said particular electronic device formed according to said first design; and during said fabricating, selectively adjusting at least one process so as to selectively change said predetermined probability to a different predetermined probability such that on any of said chips said at least one instance of said particular electronic device has said different predetermined probability of having said specific variation.

17. The method of claim 16, said selectively adjusting of said at least one process comprising selectively adjusting one of a heating process, a growth process, an oxidation process, a lithographic process, and a doping process and said selectively adjusting of said lithographic process comprising deliberately degrading a quality of a projected image to increase variability of edge placement.

18. The method of claim 16, further comprising sorting said chips based on the presence or absence of said specific defect.

19. The method of claim 16, said specific defect comprising one of a dislocation, a short and an open.

20. The method of claim 16, further comprising:
for each chip, testing each of multiple instances of said electronic device to generate a pattern of logic values indicative of some of said multiple instances of said electronic device having said specific defect and others of said multiple instances of said electronic device not having said specific defect; and
using said pattern of logic values as at least one of an on-chip identifier and a private key.

21. The method of claim 16, said predetermined probability being approximately 50%.

* * * * *